Figure 1:
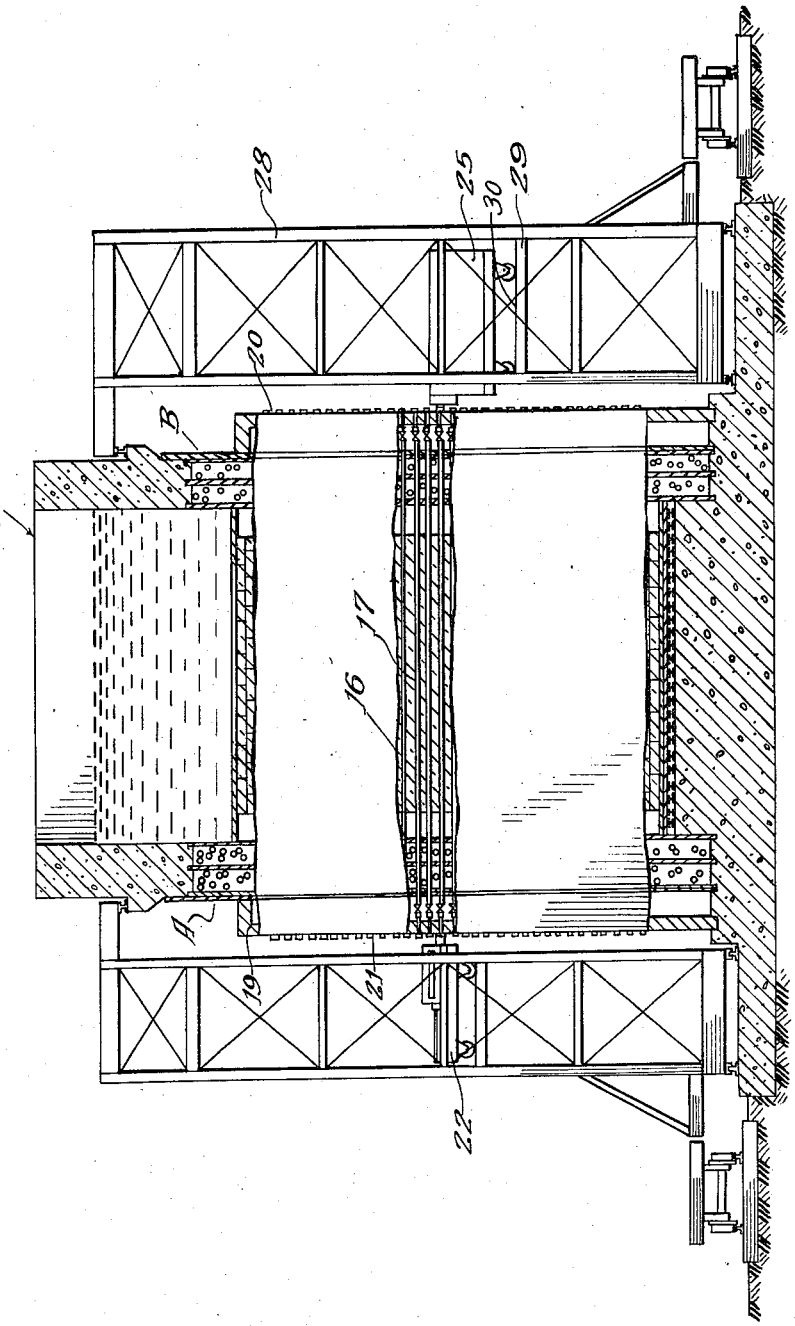

Sept. 23, 1958 L. A. OHLINGER 2,853,625
DISCHARGE DEVICE FOR RADIOACTIVE MATERIAL
Filed Aug. 13, 1945 2 Sheets-Sheet 1

Witnesses:
Herbert E. Metcalf
Francis W. Test

Inventor:
Leo A. Ohlinger
By Robert A. Lorensen
Attorney.

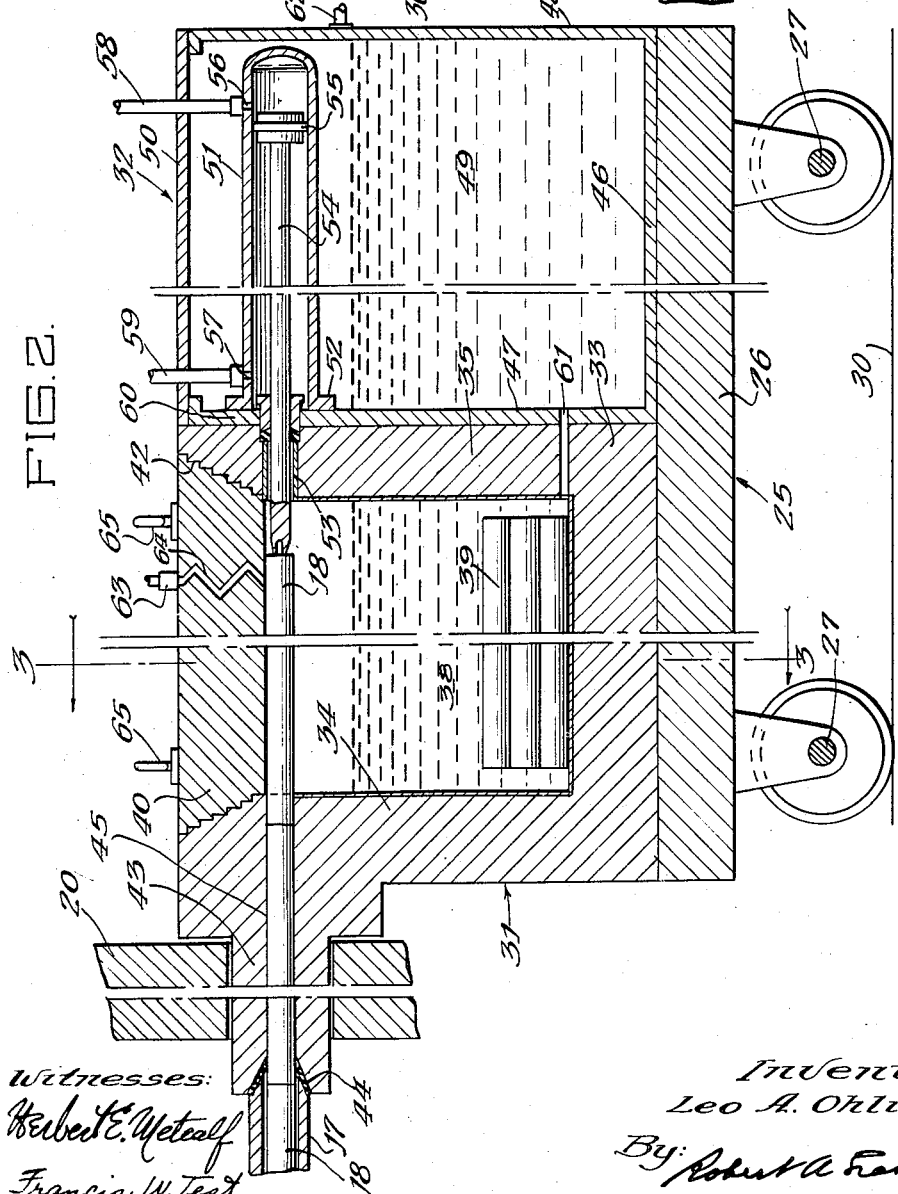

United States Patent Office 2,853,625
Patented Sept. 23, 1958

2,853,625

DISCHARGE DEVICE FOR RADIOACTIVE MATERIAL

Leo A. Ohlinger, Chicago, Ill., assignor to the United States of America as represented by the United States Atomic Energy Commission Application August 13, 1945, Serial No. 610,648

8 Claims. (Cl. 250—108)

This invention relates to a device for unloading bodies of fissionable material from a neutronic reactor. It is intended primarily for use in unloading bodies that have been irradiated with neutrons to the extent that they have become highly radioactive.

In a neutronic reactor bodies comprising a neutron fissionable isotope are arranged in a neutron moderator in such a manner as to produce a self-sustaining neutronic reaction. Fissionable isotopes such as $U^{233}$, $U^{235}$ or $94^{239}$ are satisfactory to sustain such reactions. Fast neutrons are evolved as a result of fissions taking place in the fissionable material and these fast neutrons are moderated by the moderating material as a result of successive collisions with nuclei of the moderating material. The neutrons thus slowed may be absorbed by nuclei of the fissionable material which produces additional fissions. Carbon, beryllium and heavy water are typical moderators suitable for use in neutronic reactors.

The details of construction and operation of neutronic reactors in no way form part of the present invention and therefore a complete description of reactors herein is unnecessary for a more complete discussion of neutronic reactors, both of their structure and operation, may be found in Fermi et al. Patent 2,708,656, dated May 17, 1955.

Normally it may be desirable that the unloading of the irradiated fissionable bodies from the neutronic reactor may be accompanied by the loading of fresh bodies of fissionable material that are to take the place in the reactor of those bodies being discharged. The relationship between the loading and unloading of the bodies likewise forms no part of the present invention and therefore a complete description of this subject matter will not be made herein but may be found in a copending application of Ohlinger et al., Serial No. 626,377 filed November 2, 1945.

Specifically, the present invention relates to a device used for unloading uranium rods or the like from a neutronic reactor. This device is of a type that can be readily moved to the reactor and disposed adjacent to any selected tube from which the uranium rods are to be discharged and when a desired number of rods have been removed from the reactor into the device forming the subject matter of the present invention, this device may be removed from the reactor and transferred to a location where its radioactive contents may be safely deposited. During the discharging operations provisions are made to protect personnel in the vicinity of the discharging device from the harmful radiations emanating from the uranium rods at all times while these rods are passing from the reactor into the discharging device and also while they are contained in the device and are being transmitted to the location where they are to be deposited.

Since the rods being discharged are highly radioactive as the result of irradiation in the reactor with neutrons, there is a large amount of radioactive decay taking place in the various isotopes making up the discharged bodies. As a result of this radioactive decay considerable heat is evolved and consequently, during the time that these bodies are being discharged from the reactor into the discharging device as well as during the time that they are disposed in the discharging device suitable means should be provided for cooling these bodies. The present invention supplies this suitable means.

The foregoing constitute some of the principal objects and advantages of the present invention others of which will be apparent from the following description and the drawings, in which Fig. 1 is a more or less diagrammatic view illustrating a neutronic reactor and showing in particular the unloading device in position to receive irradiated bodies to be discharged from the reactor;

Fig. 2 is a vertical longitudinal sectional view taken through the unloading device forming the subject matter of the present invention; and Fig. 3 is a vertical transverse sectional view taken through the loading device on the line 3—3 of Fig. 2, portions of the device being shown in elevation.

Referring particularly to Fig. 1 of the drawings, the neutronic reactor is indicated generally at 15. Since the details of this reactor form no part of the present invention, only those portions deemed necessary for an understanding of the invention will be set forth. For purposes of this understanding it will be sufficient to state only that the reactor 15 includes a moderator 16 of graphite, for example, through which are disposed a plurality of horizontal tubes 17 adapted to accommodate therein the bodies of fissionable material. For present purposes these bodies of fissionable material will be illustrated in the form of uranium rods shown at 18 in Fig. 2.

Again referring to Fig. 1, the reactor 15 may be provided with a charging side A, at which side the uranium rods are introduced into the reactor, and a discharging side B, at which side the uranium rods are removed from the reactor. For purposes of illustration a lead shield 19 is positioned across the face of the charging side A and a second lead shield 20 is disposed across the face of the discharging side B of the reactor. The tubes 17 extend beyond the moderator 16 at both sides of the reactor and stop short of the shields 19 and 20. The shields 19 and 20 are perforated opposite each of the tubes 17 and suitable plugs 21 of lead or like material are disposed in these perforations. At the charging side A of the reactor 15 is provided some suitable device such as a car 22 for introducing uranium rods into the tubes 17.

The discharging device forming the subject matter of the present invention is shown in the form of a car 25 located at the discharging side B of reactor 15. This car as shown in Figs. 1 and 2 may be in the form of a flat car having a floor 26 mounted on wheeled axles 27. In order that this car 25 may be moved up and down to be aligned with the tubes 17 an elevator structure 28 may be provided and may include an elevator platform 29 adapted to move vertically on the structure 28. This elevator structure 28 in turn may be mounted on wheels that ride on tracks 30 in a horizontal position across the face of the shield 20 at the discharge side B of the reactor 15. Thus the car 25 may be moved horizontally and vertically with respect to the face of the reactor so that the car may be aligned with any selected tube 17.

Referring now to Figs. 2 and 3, the floor 26 of the car 25 may carry a shielded receptacle generally indicated at 31 and a water reservoir generally indicated at 32.

This shielded receptacle 31 is provided with a bottom wall 33, front and rear walls 34 and 35 respectively, and side walls 36 and 37 all of which walls are relatively thick and are made of some suitable gamma ray absorbing material such as lead. The walls 33 to 37 inclusive are spaced and arranged in such a manner as to provide a chamber 38 of sufficient size to accommodate a plurality of uranium rods indicated at 39. These walls are of sufficient thickness so that gamma rays emanating from the uranium rods 39 contained in the chamber 38 are effectively absorbed before they have an opportunity to reach the exterior of the shielded receptacle 31.

The receptacle 31 is open at the top and is provided with a cover 40 that likewise is made of lead or other suitable gamma ray absorbing material of sufficient thickness to prevent passage therethrough of these gamma rays. As shown, the opening at the top of the shielded receptacle 31 along its sides is stepped as at 42 and the cover 40 is correspondingly stepped so as to effect a complete closure for the receptacle 31. These steps 42 are provided so as to destroy any optical path that may otherwise be present between walls of the receptacle 31 and the cover 40 thereby eliminating the opportunity for gamma rays to pass through any space between the cover 40 and the walls of the receptacle 31.

As previously mentioned, each of the tubes 17 in the reactor terminates short of the lead shield 20 disposed on the discharge side B of the reactor. Thus in order for the car 25 to engage a tube 17 it is necessary under these circumstances for the front wall 34 of the receptacle 31 to be provided with a projecting portion referred to herein as snout 43 that is adapted to pass through each opening in the shield 20 and to engage the end of each tube 17. A gasket 44 may be provided in the end of snout 43 against which gasket each tube 17 may be sealed during the discharging operation. A passage 45 extends through the snout 43 and the wall 34 into the chamber 38. This passage 45 is of sufficient diameter to accommodate a rod 18 that is to pass therethrough from tube 17 into the chamber 38.

The water reservoir 32 is in the form of a tank having a bottom wall 46, a front wall 47, a rear wall 48 and side walls that complete a box-like enclosure forming a water chamber 49. A cover 50 closes the open side of the reservoir. As shown, the water reservoir 32 abuts against the shielded receptacle 31.

Disposed in the upper region of the water reservoir 32 is a cylinder 51 that is mounted on the wall 47 by some suitable means such as a flange 52 welded or otherwise secured to the wall. A passage 53 extends from chamber 38 through rear walls 35 and 47 of the shielded receptacle 31 and into the cylinder 51.

Disposed in cylinder 51 is a plunger 54 that projects through the passage 53 in the walls 35 and 47 into the chamber 38. On the opposite end of plunger 54 is a piston 55 adapted to reciprocate in the cylinder 51. Ports 56 and 57 are disposed at opposite ends of the cylinder 51 and pipes 58 and 59 convey hydraulic fluid to and from these ports. A packing gland 60 surrounds the plunger 54 and seals the opening around the plunger 54 through the walls 45 and 47.

Adjacent to the bottom of chamber 38 is a water passage 61 that allows water in the reservoir 32 to flow into the chamber 38. A supply of water (not shown) may be introduced into the reservoir 32 through a suitable tube 62.

As a result of cooling the radioactive rods 39 which are already in chamber 38 with water introduced through passage 61 from chamber 49 considerable steam may be generated. Some of this steam may escape through passage 45 but it may be desirable to supply an exhaust valve 63 that is mounted on the cover 40 and communicates with the chamber 38 through a tortuous passage 64. The cover 40 may be provided with eyelets 65 for use in removing and applying the cover to the receptacle 31.

When operating the car 25 for removal of rods 18 from one of the tubes 17 in the reactor it is first necessary to remove the lead plug 21 (Fig. 1) that covers the end of the tube and fills the corresponding perforation in the shield 20. This, of course, is done at a time when the flow of coolant through the tubes 17 in the reactor has been shut off or at least controlled so that it will not spill out the end of the tubes 17. The car 25 is then moved into position shown in Fig. 2, for example, with its snout 43 sealed against the tubes 17. The plunger 54 is then moved by virtue of introducing hydraulic fluid by pipe 58 into the cylinder 51 to a position inside the passage 45. The uranium rods 18 in tube 17 are then moved toward the discharge end of the tube until the first rod 18 enters the passage 45 in the snout 43 and engages the end of the plunger 54. At this time the plunger 54 is caused to move in a direction from left to right by introducing hydraulic fluid through pipe 59 into cylinder 51 during which operation hydraulic fluid formerly introduced on the other side of the piston 55 is exhausted through pipe 58. While the plunger 54 is thus moving from left to right the uranium rod 18 that engages the end of the plunger is likewise being forced in a direction from left to right at the same rate of speed and is in fact being guided by the plunger 54. When this rod 18 enters chamber 38 and is moved into the chamber it is supported at its free end by the plunger 54 until it has entered the chamber a sufficient distance for its opposite end to become free of the passage 45, at which time this rod 18 drops to the bottom of chamber 38. The plunger 54 is then moved in a direction from right to left in Fig. 2 until it engages the end of the next uranium rod 18 and then the action is repeated and this second rod is guided into chamber 38 and allowed to drop horizontally to the bottom thereof. These operations are repeated until the desired number of rods 18 are ejected from the reactor.

As previously mentioned, the operation of discharging irradiated uranium rods 18 from the passage 17 is accompanied by the replenishing of fresh uranium rods 18 at the charging side A of the reactor. Thus the force exerted on the irradiated rods to discharge them from the reactor is applied against fresh rods being admitted at the opposite end of the tube 17 and as irradiated rods are removed fresh ones are being introduced into the other end. Consequently, when the last irradiated rod has been ejected from tube 17 there is disposed in the snout 43 of the car 25 a nonradioactive rod that has been exerting pressure against the last irradiated rod. This non-radioactive rod may either be a fresh uranium rod or a dummy rod of nonfissionable material but in any event, after all irradiated rods have been removed from tube 17 this nonradioactive rod must be returned into the reactor and this is done by the plunger 54 that pushes the rod back into tube 17 and disposes it in its proper place in the tube at the completion of the discharging operation. The plunger 54 is then allowed to remain extended into the passage 45 in snout 43 so as to serve as a plug. The car 25 is then rolled back away from the shield 20, the tube 17 is then covered by plug 21 that also closes the perforation in shield 20 and the car 25 may then be lowered on the elevator and removed to the location where its contents can be emptied.

During all of these operations in discharging the uranium bodies 18 from a tube 17 in the reactor, cooling of the irradiated rods may be continued by allowing coolant from the tubes 17 to flow through the passage 45 and in contact with the uranium rods disposed therein and finally into the chamber 38 over the uranium rods 39. This water may be supplemented by water from the reservoir 49. After the irradiated rods have been completely discharged from the tube 17, however, and the car 25 backed away from the reactor water for cooling the rods 39 is supplied from the chamber 49 and this supply may be supplemented from an outside source through the tube 62.

As previously mentioned, uranium rods are selected for purposes of illustrating the bodies of fissionable material that are to be discharged from the reactor. Obviously, fissionable material other than uranium may be employed and it is not intended that the present invention should be limited to the handling of rods, as

What is claimed is:

1. A discharge device comprising a receptacle including a storage chamber for a plurality of bodies, a removable cover for the receptacle, a snout projecting from one wall of the receptacle having a passage extending into the receptacle, means aligned with the passage for supporting a body introduced therethrough, and a reservoir of cooling medium adjacent the receptacle and connected to the chamber.

2. A discharge device comprising a receptacle including a storage chamber for a plurality of radioactive bodies, a removable cover for the receptacle having a tortuous vent therein, the cover and the walls of the receptacle having a thickness to absorb radioactive radiations, a snout projecting from one wall above the chamber and having a passage extending into the receptacle, means aligned with the passage for supporting bodies introduced therethrough, and a reservoir of cooling medium adjacent the receptacle and connected to the chamber.

3. A discharge device comprising a receptacle including a storage chamber for a plurality of radioactive bodies, a removable cover for the receptacle having a tortuous vent therein, the cover and the walls of the receptacle having a thickness to absorb radioactive radiations, a snout projecting substantially horizontally from one wall above the chamber and having a passage extending into the receptacle, means aligned with the passage for supporting bodies introduced therethrough, and a reservoir of cooling medium adjacent the receptacle and connected to the chamber.

4. A discharge device comprising a receptacle, a removable cover for the receptacle having a tortuous vent therein, the cover and the walls of the receptacle having a thickness to absorb radioactive radiations, a snout projecting from one wall and having a passage extending into the receptacle, a storage chamber within the receptacle below the snout and having a capacity for a plurality of radioactive bodies, means aligned with the passage for supporting the bodies introduced therethrough, and a reservoir of cooling medium adjacent the receptacle and connected to the chamber.

5. A discharge device comprising a receptacle, a removable cover for the reecptacle having a tortuous vent therethrough, the cover and the walls of the receptacle having a thickness to absorb radioactive radiations, a snout projecting substantially horizontally from one wall and having a passage extending into the receptacle, a storage chamber within the receptacle below the snout and having a capacity for a plurality of radioactive bodies, means including a plunger aligned with the passage for supporting the bodies introduced therethrough, and a reservoir of cooling medium adjacent the receptacle and connected to the chamber.

6. A discharge device comprising a wheeled flat car, a receptacle including a storage chamber for a plurality of radioactive bodies on the flat car, a removable cover for the receptacle having a tortuous vent therethrough, the cover and the walls of the receptacle having a thickness to absorb radioactive radiations, a snout projecting substantially horizontally from one wall and having a passage extending into the receptacle, means including a plunger aligned with the snout passage for supporting the bodies introduced therethrough, and a reservoir of cooling medium adjacent the receptacle and connected to the chamber.

7. A discharge device comprising a wheeled flat car, a receptacle on the flat car, a removable cover for the receptacle having a tortuous vent therethrough, the cover and the walls of the receptacle having a thickness to absorb radioactive radiations, a snout projecting substantially horizontally from one wall and having a passage extending into the receptacle, a storage chamber within the receptacle below the snout and having a capacity for a plurality of radioactive bodies, means including a plunger aligned with a passage for supporting the bodies introduced therethrough, and a reservoir of cooling medium adjacent the receptacle and connected to the chamber.

8. A discharge device comprising a wheeled flat car, a receptacle on the flat car, a removable cover for the receptacle having a tortuous vent therethrough, the cover and the walls of the receptacle having a thickness to absorb radioactive radiations, a horizontal snout projecting from one wall and having a passage extending into the receptacle, a storage chamber within the receptacle below the snout and having a capacity for a plurality of radioactive bodies, a reciprocable plunger aligned horizontally with the passage, a cylinder in the wall opposite the passage and aligned therewith, a piston in the cylinder integral with the plunger, means operating the piston, and a reservoir of cooling medium on the flat car adjacent the receptacle and connected to the chamber.

References Cited in the file of this patent

UNITED STATES PATENTS

| | | |
|---|---|---|
| 1,278,307 | Cressler | Sept. 10, 1918 |
| 1,286,070 | O'Connor | Nov. 26, 1918 |
| 1,372,594 | Borie | Mar. 22, 1921 |
| 1,981,829 | Stiriss | Nov. 20, 1934 |
| 2,192,303 | Ferm | Mar. 5, 1940 |
| 2,247,770 | Cox | July 1, 1941 |
| 2,264,125 | Wolf et al. | Nov. 25, 1941 |
| 2,357,126 | Nachtman | Aug. 29, 1944 |

FOREIGN PATENTS

| | | |
|---|---|---|
| 122,119 | Great Britain | Jan. 16, 1919 |
| 114,150 | Australia | May 2, 1940 |
| 861,390 | France | Oct. 28, 1940 |
| 233,011 | Switzerland | Oct. 2, 1944 |

OTHER REFERENCES

A General Account of the Development of Methods of Using Atomic Energy for Military Purposes; pamphlet by Smyth, pages 82–87, August 1945.